(12) United States Patent
Brugel

(10) Patent No.: US 6,646,134 B2
(45) Date of Patent: Nov. 11, 2003

(54) MANUFACTURE OF CYCLIC ESTER OLIGOMERS

(75) Inventor: Edward G. Brugel, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/083,864

(22) Filed: Feb. 25, 2002

(65) Prior Publication Data

US 2003/0009037 A1 Jan. 9, 2003

Related U.S. Application Data

(60) Provisional application No. 60/351,616, filed on Jan. 24, 2002, provisional application No. 60/272,096, filed on Feb. 28, 2001, provisional application No. 60/272,095, filed on Feb. 28, 2001, provisional application No. 60/272,094, filed on Feb. 28, 2001, and provisional application No. 60/272,093, filed on Feb. 28, 2001.

(51) Int. Cl.[7] ............................................. C07D 323/00
(52) U.S. Cl. ....................................................... 549/267
(58) Field of Search ......................................... 549/267

(56) References Cited

U.S. PATENT DOCUMENTS

| | | |
|---|---|---|
| 2,020,298 A | 11/1935 | Carothers et al. |
| 5,214,158 A | 5/1993 | Brunelle et al. |
| 5,407,984 A | 4/1995 | Brunelle et al. |
| 5,466,744 A | 11/1995 | Evans et al. |
| 5,661,214 A | 8/1997 | Brunelle et al. |

FOREIGN PATENT DOCUMENTS

| | | |
|---|---|---|
| EP | 798 336 A2 | 10/1997 |

OTHER PUBLICATIONS

Andrew J. Hall et al., Recent Research On The Synthesis And Applications Of Cyclic Oligomers, Reactive & Functional Polymers 41 (1999), pp. 133–139.

Hans R. Kricheldorf et al., Macrocycles. 15. The Role of Cyclization in Kinetically Controlled Polycondensations. 1. Polyester Syntheses, Macromolecules 2001, 713–722, 2001 American Chemical Society.

*Primary Examiner*—Amelia Owens

(57) ABSTRACT

Cyclic ester oligomers (CEOs) are manufactured from linear polyesters or their precursors by a continuous reactive extraction in which the linear polyesters are converted to the CEOs and the CEOs selectively removed from the mixture by extraction with a fluid. The fluid may be a liquid or a gas. The CEOs prodcued are useful as monomers, for example in a reaction injection molding process to rapidly form polyesters from low viscosity liquids.

17 Claims, 4 Drawing Sheets

MANUFACTURE OF CYCLIC ESTER OLIGOMERS

CROSS-REFERENCE TO RELATED APPLICATION

This application claims the benefit of U.S. Provisional Appliction No. 60/351,616 filed Jan. 24, 2002, U.S. Provisional application No. 60/272,096, filed Feb. 28, 2001, U.S. Provisional Application No. 60/272,095, filed Feb. 28, 2001, U.S. Provisional Application No. 60/272,094, filed Feb. 28, 2001, U.S. Provisional Application No. 60/272,093, filed Feb. 28, 2001.

FIELD OF INVENTION

The field of invention relates to cyclic ester oligomers (CEOs), and in particular, to CEOs manufactured from linear polyesters or their precursors.

BACKGROUND OF INVENTION

Cyclic ester oligomers (CEOs) have been known for a long time, see for instance U.S. Pat. No. 2,020,298. They are known to be present in varying, usually small, quatities in many linear polyesters and have been isolated from such linear polyesters. They are often low viscosity liquids, and it has been known for a long time that they may be polymerized to higher molecular weight linear polyesters by ring opening polymerization, see for instance U.S. Pat. Nos. 5,466,744 and 5,661,214 and refeences cited therein. This ability to readily form a high molecular weight polymer from a relatively low viscosity liquid has made these CEOs attractive as materials for reaction injection molding type processes, wherein a low viscosity material is converted to a high molecular polymer in a mold, so that a final shaped part is obtained.

However, such CEOs have been difficult and expensive to prepare, for example, requiring very high dilution conditions and/or using relatively expensive starting materials such as diacyl halides in conjunction with diols and a base to react with the HCl formed, see for instance U.S. Pat. No. 5,466,744. Therefore, lower cost routes to CEOs are of great interest in view of these high manufacturing costs.

In a paper concerned with the synthesis of CEOs, H. R. Kricheldorf, et al., Macromolecules, vol. 34, p. 713–722 (2001) (herein Kricheldorf), two types of situations for the synthesis of CEOs are described: a kinetically controlled scenario and an equilibrium controlled scenario. Kircheldorf shows that in a kinetically controlled scenario nearly quantitative yields of CEOs can be obtained in concentrated solutions if certain ideal conditions are met (it appears the conditions were similar in U.S. Pat. Nos. 5,466,744 and 5,214,158) in the process. Unfortunately, relatively expensive ingredients are used, and such ideal conditions are difficult to achieve in commercial processes. As Kircheldorf points out, the process he uses is kinetically controlled.

Most (linear) polyester manufacturing, however, is carried out under equilibrium conditions, such as melt polymerization and/or solid state polymerization. When preparing CEOs under such conditions, for example from linear polyesters, high dilution is required, see for instance U.S. Pat. No. 5,407,984, in which small amounts of linear polyester are converted in highly dilute solution to CEOs. All of this chemistry depends upon the fact that various ester linkages are, under conditions where the reaction rates are high enough, labile and in equilibrium with one another.

One can represent a polyester made from a diol (D) and a dicarboxylic acid (A) by the formula —(AD)$_n$— (I) where the end groups are unspecified. The ester groups within (I) and between molecules of (I), as well as the hydroxyl and carboxyl groups in (I) (the end groups) are, under the proper conditions (usually elevated temperatures and optionally in the presence of esterification/transesterification catalysts), in equilibrium with one another. This chemistry forms the basis for the melt and solid state polymerizations to form linear polyesters. For instance:

(1)

(2)

(3)

It is evident that by repetition of equations (2) and (3) the molecular weight of the polymer being formed may be built up, particularly if the equilibrium is forced to the right in each instance by removal of the byproduct water. It is also evident that the product of equation (2) may cyclize to the cyclic ester dimer according to equation (4).

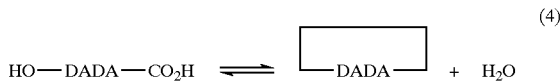

(4)

Equation (4) illustrates one way in which the CEOs can be in equilibrium with the linear polyesters (there are other ways, see below). Although equation (4) shows a CEO being formed by an esterification, they can also be formed by transesterification. The linear polyester molecular weight may also be built up by reactions such as

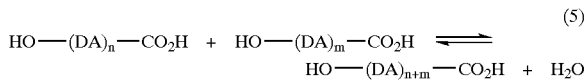

(5)

All of the reactions shown so far are esterifications, and any of the ester groups within these molecules may undergo ester exchange also, and as one can see, complex equilibria between various species may exist. However so long as water (or alcohol or diol if esters are part of the starting materials) is removed from the system, which is usually accomplished by the application of heat and sometimes vacuum, the molecular weight of resulting polymer will be increased. As it turns out, the equilibrium between linear and cyclic esters in this type of system usually favors the linear polyesters in concentrated conditions. As conditions become more dilute in the polyester (cyclic or linear) the equilibrium shifts in favor of the cyclic esters. Thus in polyesters produced by a melt process or a so-called solid state process the polyester is concentrated (usually only polyester plus a small amount of catalyst is present), so that while CEOs are present in the product of such processes, they are usually present in small amounts.

Another type of reaction that may be important for the formation of CEOs from linear esters, and the formation of linear polyesters from CEOs is thought to be

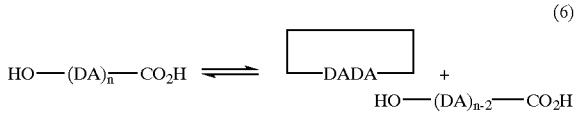

A similar reaction could be written using an end hydroxyl group. All of the processes for making CEOs from linear polyesters until now have simply heated the linear polyesters under very dilute conditions so that more cyclics were formed in the reactor.

In all of equations (2)–(6) the choice of end group, and in some cases which end groups reacts, hydroxyl or carboxyl, is somewhat arbitrary, and other combinations are clearly possible and likely.

All of the above esterification/transesterification reactions may be speeded up by the addition of esterification/transesterification catalysts, although it is important to realize that certain catalysts may favor polymerization, depolymerization, linears and cyclics, or combinations of these.

SUMMARY OF INVENTION

This invention includes processes for the production of cyclic ester oligomers, comprising, subjecting a linear polyester to a continuous reactive extraction at a temperature at which said linear polyester is molten and which is sufficient to cause formation of said cyclic ester oligomers, wherein at least some of said linear polyester is converted to one or more cyclic ester oligomers and said extraction is carried out by a fluid which is one or both of a liquid and a gas to separate said cyclic ester oligomers from said linear polyester.

DETAILED DESCRIPTION OF PREFERRED EMBODIMENTS

Figure 1:
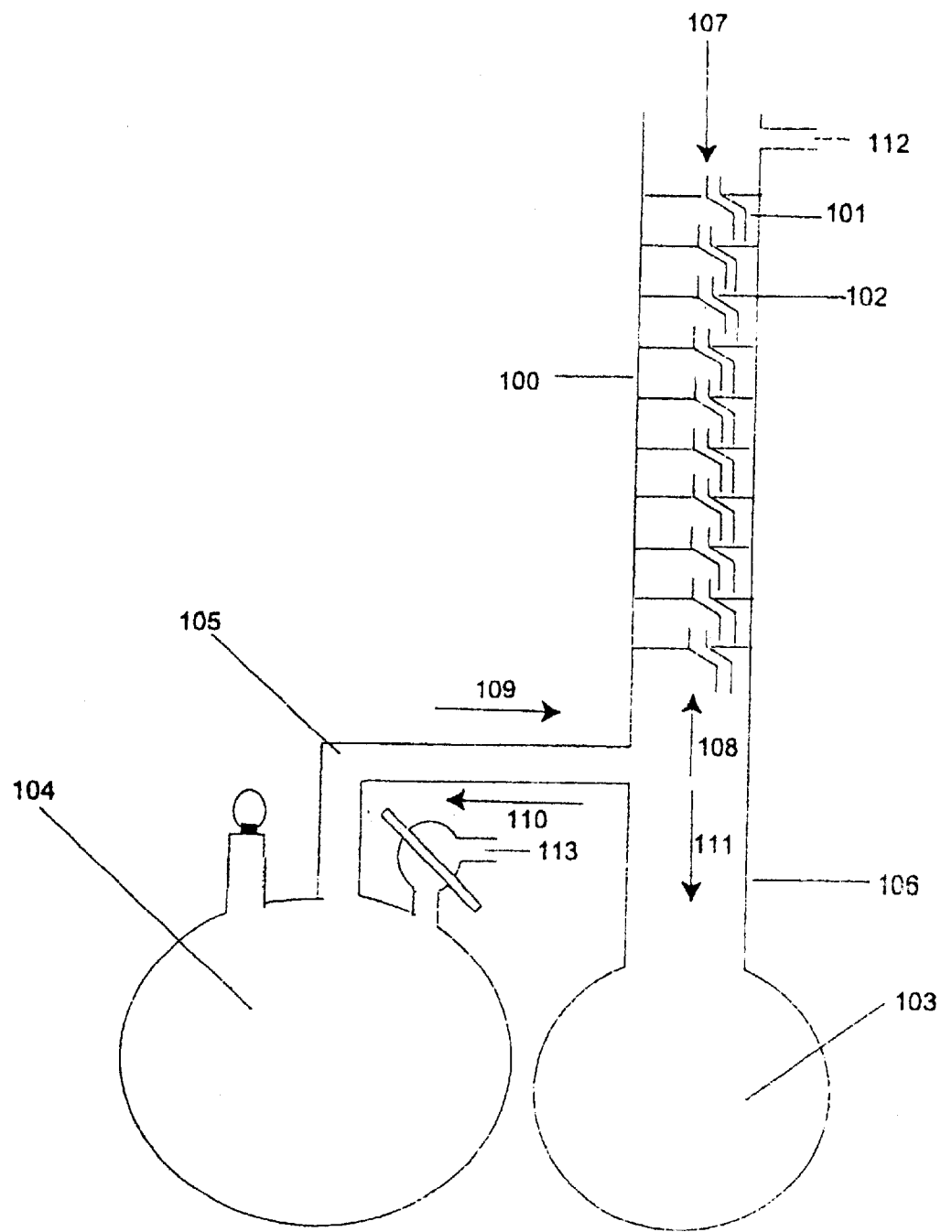
FIGS. 1–4 show preferred embodiments of column reactor set-ups that may be used to carry out processes of the instant invention.

Herein certain terms are used and some of them are defined below:

By a "continuous reactive extraction (CRE)" herein is meant a process wherein linear polyester ester is continuously converted to CEOs, while simultaneously CEOs are separated (extracted) from the linear polyester from which they were formed.

By a "linear polyester (LPE)" is meant (particularly as opposed to a CEO) a polyester which is not cyclic, and this includes both high and low (for example oligomers) molecular weight materials, and also includes monomeric compounds which under the process conditions form linear polyesters. Cyclic monomers such as for instance aromatic diacids and/or diols or 1,4-cyclohexane dicarboxylic acid, may be present in the linear polyester. The word linear refers to the overall architecture of the polymer molecule, not the architecture of individual repeat units. These linear polyesters may contain (usually small) amount of CEOs which are normally made in the preparation of the LPEs, for example, by melt or solid state polymerization. The linear polyester is derived from a combination of one or more diols and one or more dicarboxylic acids, a combination of one or more diols, one or more dicarboxylic acids and one or more hydroxyacids, or a combination of one or more hydroxyacids. Other small amounts of other types of "monomers" may also be present in the linear polyester, for example small amounts of trifunctional compound which cause relatively small amounts of branching in the linear polyester.

By a "fluid" is meant a suitable liquid or gas.

By "molten" herein, as applied to a polymer, is meant a polymer which is above its highest glass transition temperature and above its crystalline melting point (if it has a crystalline melting point), whichever is highest. Glass transition temperature melting points are measured by Differential Scanning Calorimetry on the "pure" linear polyesters (no liquid fluid present) using the procedure of ASTM method D3418. Melting points are taken as the peak of the melting endotherm, while glass transition points are taken as the midpoint of the measured transition. If the fluid is a liquid, and at process temperatures the liquid swells the LPE more than 1 volume percent, the sample for glass transition temperature and melting point is prepared by heating the LPE in the liquid to the process temperature and then cooling the LPE (swollen with liquid) to room temperature. The test is then run on the swollen LPE. If the LPE is significantly swollen, the glass transition temperature and/or melting point (if present) may be significantly lowered from that measured with pure LPE. In this instance the glass transition temperature or the melting of the swollen LPE is the taken for the temperature limitation herein. Note that the glass transition temperature and/or melting point of a linear polyester may vary with molecular weight. It is the melting point and/or glass transition temperature of the linear polyester actually being added to the process which is the benchmark to be used herein.

By "hydrocarbylene" herein is meant a divalent group containing carbon and hydrogen which has two free valencies, each to a different carbon atom.

By "alkylene" herein is meant a saturated divalent group containing carbon and hydrogen which has two free valencies, each to a different carbon atom.

By "arylene" herein is meant a divalent group containing one or more aromatic rings, having two free valencies to 2 different carbon atoms which are part of aromatic rings. If more than one aromatic ring is present the free valencies may be to carbon atoms on the same or different rings. The aromatic rings may be fused as in naphthalene, connected by a covalent bond as in biphenyl, or connected by a covalently bonded group, as in diphenyl ether.

By "substituted" herein is mean that the group or radical group contains one or more substituent groups which are inert under the process conditions to which the compound containing these groups is subjected. The substituent groups also do not substantially interfere with the process. Included in the meaning of "substituted" are heteroaromatic rings. In substituted hydrocarbyl all of the hydrogens may be substituted, as in trifluoromethyl. Preferred groups for substitution include (where appropriate) alkyl, aryl, ether, halo, oxo (keto), ester, etc.

By "average degree of polymerization" herein is meant the average number of repeat units such as (I) in a polymer chain of an LPE.

In this process a fluid is used to extract the CEO from the process mixture, especially the mixture containing the LPE. This fluid may be a liquid or a gas. If it is a gas, the only requirement is that the gas be inert to the process ingredients under the process temperature. Typical gases may be nitrogen, and argon. Oxidizing gases such as oxygen and oxygen containing gases should normally be avoided to avoid oxidation of the process ingredients especially at the elevated process temperature.

If the fluid is a liquid, the CEO preferably has some reasonable solubility in the liquid. Preferably the CEO (or mixture of CEOs) should have a solubility of at least about 0.1% by weight, more preferably at least about 1.0% by weight and very preferably at least about 2.0% by weight in the liquid at the process temperature. Process temperature in this context means the temperature at which the LPE is converted to the CEO(s). The higher the solubility of the CEO in the liquid the more favorable the economics of the process can be, since less liquid is required to extract the CEOs. However as the concentration of CEOs in the liquid increases, the concentration of LPEs in the liquid may also increase, since, as noted above, as the concentration of the polyester (in both LPE and CEO forms) increases, the equilibrium favors the presence of more LPE in the mixture. Thus the optimum solubility or amount of CEO in the liquid during the process may be a compromise between economics of CEO production and the purity of the CEO produced.

It is also preferred that the CEO(s) have a solubility at 50° C. in the liquid of only about 20% or less, more preferably about 10% or less and especially preferably 5% or less, of its solubility at the process temperature. The solubility of the LPE added to the process in the liquid should preferably be about 5% by weight or less, more preferably about 2% by weight or less, of the solubility of the CEOs in the liquid at the process temperature. In other words, the CEOs should preferably be more soluble in the liquid than the LPE.

The liquid chosen is preferably reasonably stable at the process temperature. Its atmospheric boiling point should preferably be above the process temperature, but this is not necessary, since the process can be run at elevated pressure to maintain the liquid in the liquid state. However this often entails added expense.

Preferable liquids include hydrocarbons such as alkanes, perfluorocompounds including those containing functional groups such as ether and tertiary amino. Preferred hydrocarbons are alkanes, especially n-alkanes such a tetradecane and hexadecane. Preferred perfluoro-compounds include tertiary amines such as perfluoro(tri-n-butylamine) and perfluoro(tri-n-pentylamine). The desired boiling point of the liquid may determine how many carbon atoms the liquid contains.

The LPE used may have as its repeat units any units as described above. Preferably the LPE is derived from a diol and dicarboxylic acid, and the repeat unit for the LPE can be written as

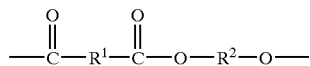

(I)

wherein each $R^1$ in the LPE is independently hydrocarbylene or substituted hydrocarbylene, and each $R^2$ in the LPE is independently hydrocarbylene or substituted hydrocarbylene. In preferred LPEs each $R^1$ is independently arylene or substituted arylene, and specifically preferred groups for $R^1$ are p-phenylene, m-phenylene, a combination of p-phenylene and m-phenylene, and 2,6-naphthylene. In especially preferred polymers $R^1$ is p-phenylene. In preferred LPEs each $R^2$ is independently alkylene or substituted alkylene, and it is more preferred that each $R^2$ is independently —$(CH_2)_y$— (II) wherein y is an integer of 2 to 6, more preferably 2, 3 or 4, or $R^2$ is —$(CH_2CH_2)_zOCH_2CH_2$— (III) wherein z is an integer of 1 to 6, more preferably 1. In another preferred LPE both (II) and (III) are present. Preferred specific polymers include poly(ethylene terephthalate) [this polymer often contains some repeat units derived from diethylene glycol which are formed in the polymer synthesis, and these polymers are included within the definition of poly(ethylene terephthalate)], poly(trimethylene terephthalate), poly(1,4-butylene terephthalate), poly(ethylene isophthalate-terepthalate), poly(1,4-butylene adipate-terephthalate), poly(1,4-butylene/ethylene terephthalate) poly(ethylene 2,6-napthalate), with poly(ethylene terephthalate), poly(trimethylene terephthalate), and poly(1,4-butylene terephthalate) being particularly preferred.

The LPE may be of any molecular weight, but it is preferred that it be of relatively low molecular weight. In equation 6 above note that the rate of formation CEOs will presumably depend on the concentration of end groups present in the process. Lower molecular weight polymers have higher end group concentrations and so are preferred. It is preferred that the LPE has an average DP of about 3 to about 100, more preferably about 3 to about 50, and especially preferably about 3 to about 10. The DP is calculation from the number average molecular weight (Mn), and the Mn is measured by Gel Permeation Chromatography (GPC) using an appropriate polyester as a calibration standard. If the Mn is very low, freezing point depression can be used instead of GPC to measure the Mn. It is preferred that the LPE have hydroxyl ends. It is believed that the reactions to form CEO from LPE are faster if the polymer chain has hydroxyl ends.

The product of the process is a CEO corresponding to the structure of the LPE originally added. For example if the LPE consisted of repeat units of (I), the CEO obtained would be

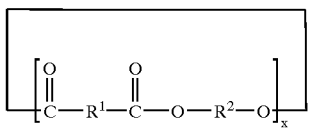

(IV)

wherein x is an integer of one or more. Usually for the great majority of the CEO recovered x will be 10 or less, and may even be only 1. This depends to a certain extent on what $R^1$ and $R^2$ are, and the process conditions used.

When a gas is used as the fluid the process may be run quite simply. The process may be run neat, that is without a solvent for the LPE, or it may be run with a solvent for the LPE to reduce the viscosity. Preferably the solvent should be relatively nonvolatile. The LPE (and solvent if present) is heated to the process temperature and the gas (fluid) is run through (bubbled through) the LPE (solution). Assuming the CEOs from the LPE are volatile enough at the process temperature, they will be stripped (extracted) from the LPE as part of the gas stream. The gas stream may be kept hot until the gas reaches the desired collection point for the CEOs, when it may be cooled and the CEOs collected as they condense in the vessel. Alternatively the gas stream may be passed through a liquid, preferably an organic liquid, and the CEOs stripped from the gas stream by the liquid. The gas may be reheated and recycled through the process. As the LPE is converted to the CEOs, fresh LPE may be added to make up for the material stripped from the LPE as CEOs. A catalyst (see below) may be present to accelerate the formation of the CEOs from the LPE.

A preferred apparatus for the process when a gas is used as the fluid is a so-called melt finisher for polyesters. Such apparatuses are known in the art. For example one type of finisher is a horizontal cylindrical reactor with the rotating shaft running horizontally through the axis of the cylinder. Attached axially to the shaft are circular screens which rotate (slowly) with the shaft. There may be one screen in the form a screw. Lower molecular weight polymer is fed to the bottom of one end of the cylinder where the rotating screens pick it up and a thin film of polymer forms on the screen(s) as they rotate. This allows the (usually hot) polymer to be exposed (in a polymerization) to vacuum which removes volatile byproducts from the polymerization reaction, thereby driving the molecular weight of the polymer to be increased. The polymer is gradually transported to the end of the reactor opposite to that from which it entered, where it is removed as a higher molecular weight polymer. Instead of vacuum, using the proper type of catalyst, gas may be passed through the "finisher" thereby removing volatile CEO(s) and converting the LPE to CEO(s). The gas may flow in the same direction as, or more preferably countercurrent to, the flow of the LPE in the finisher.

Preferred processes to form CEOs may also be run using a liquid as the fluid in the process. As noted above, this liquid should (preferably) have certain properties associated with it. In many situations it is preferable that the CRE stage of the process be run at the boiling point, preferably the atmospheric boiling point, of the liquid. This allows easy control of the process temperature, and also allows the liquid to be "transported" to a desired point in the process as a gas, where it may be condensed to the liquid state.

Herein any of the preferred conditions and/or values for the process may be combined with any of the preferred conditions and/or values for that process to form a more preferred process.

There are many configurations that can be used to run the process. Some preferred embodiments are shown in FIGS. 1–4.

With reference to FIG. 1, there is provided a column 100 with sieve trays 102 and downcomers 101, a supply/collector flask 104 connected thereto by connector 105, and a 2-way adapter 106 connecting the column to a polymer receiving flask 103. A first inlet 112 (e.g., a nitrogen inlet) and a second inlet 113 (e.g., a second nitrogen inlet) are also provided.

In the set-up of FIG. 1, liquid (not shown) is initially provided to supply/collector flask 104 and heated by a suitable heating element (not shown), which is brought to a boil. The boiling liquid then refluxes upwards through connector 105 in the direction of third arrow 109 up though column 100 in the direction of second arrow 108. At the top of the column, LPE (not shown) is introduced into the top sieve tray 102. The liquid, in its vapor phase, contacts the LPE, which immediately begins to melt (or the LPE may be added already molten) The molten LPO simultaneously drips down the holes (not shown) in the sieve trays 102 (and sometimes downcomers 101) through the column 100 in the direction of first arrow 107. The liquid vapor phase condenses and flows down the column 100 in the direction of first arrow 107 through each sieve tray 102 through downcomers 101 while in contact with the molten LPE. Simultaneously, throughout column 100, the molten LPE de-polymerizes into CEO(s), which is carried away in the solvent condensate flowing down the column 100. Connector 105 is positioned such that the returning liquid condensate flows down connector 105 in the direction of fourth arrow 110 back into supply/collector flask 104, whereas the molten LPE falls in the direction of fifth arrow 111 through 2-way adapter 106 into the polymer receiving flask 103.

Liquid condensate may also flow into the polymer receiving flask 103. The molten LPE collected in polymer receiving flask 103 may be recycled to the top of the column 100.

Figure 2:
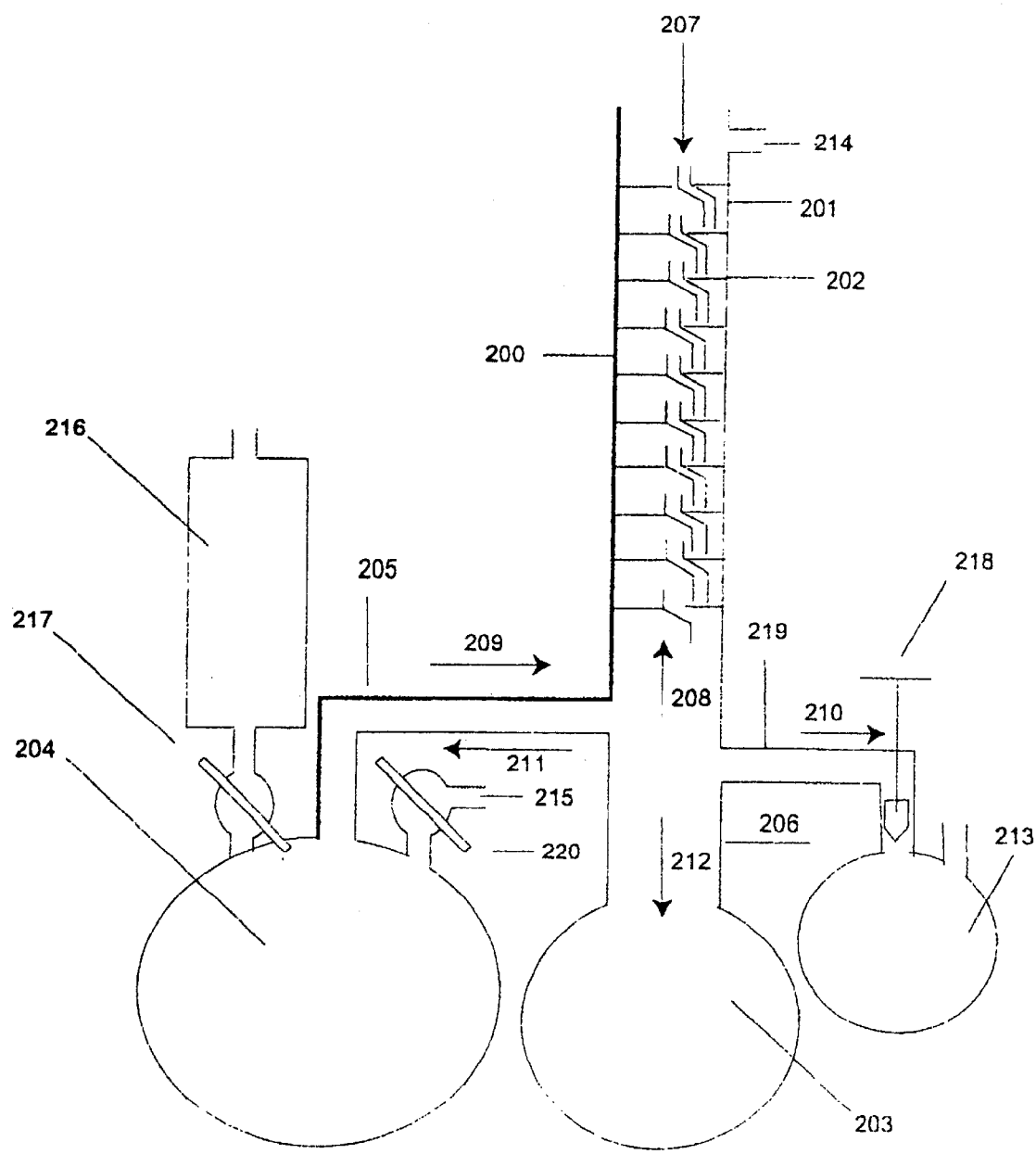

With reference to FIG. 2, there is provided a column 200 with sieve trays 202 and downcomers 201, a supply/collector flask 204 connected thereto by a first connector 205. A first valve 217 regulates solvent fresh feed 216 to supply/collector flask 204. A polymer receiving flask 203 is connected to the column 200 by an 2-way adapter 206, and a second connector 219 and second valve 218 connects a receiving flask 213. Also provided is a first inlet 214 (e.g., a nitrogen inlet). Also provided is a second inlet 215 (e.g., a nitrogen inlet) regulated by a third valve 220.

The set-up in FIG. 2 operates similarly to the set-up in FIG. 1. Boiling liquid (not shown) in supply/collector flask 204 refluxes up through first connector 205 in the direction of third arrow 209 and up the column 200 in the direction of second arrow 208. Solid LPE (not shown) (which may also be added molten) is provided at the top of the column. The molten LPE flows down the column 200 through sieve trays 202 (and sometimes downcomers 201) in the direction of first arrow 207. The liquid condensate also flows down the column 200 in the direction of first arrow 207. However, second connector 219 is positioned such that the returning liquid condensate flows through second connector 219 in the direction of fourth arrow 210 and into receiving flask 213 (although some returning liquid condensate may still flow through first connector 205 in the direction of fifth arrow 211). The molten LPE flows down through 2-way adapter 206 in the direction of sixth arrow 212 and into polymer receiving flask 203, where it may be recycled back to the top of column 200. Liquid condensate may also flow into polymer receiving flask 203. Liquid fresh feed 216 may provide. additional liquid into supply/collector flask 204, in order to make up for the lack of return of liquid condensate from the column 200, as in the set-up of FIG. 1.

Figure 3:
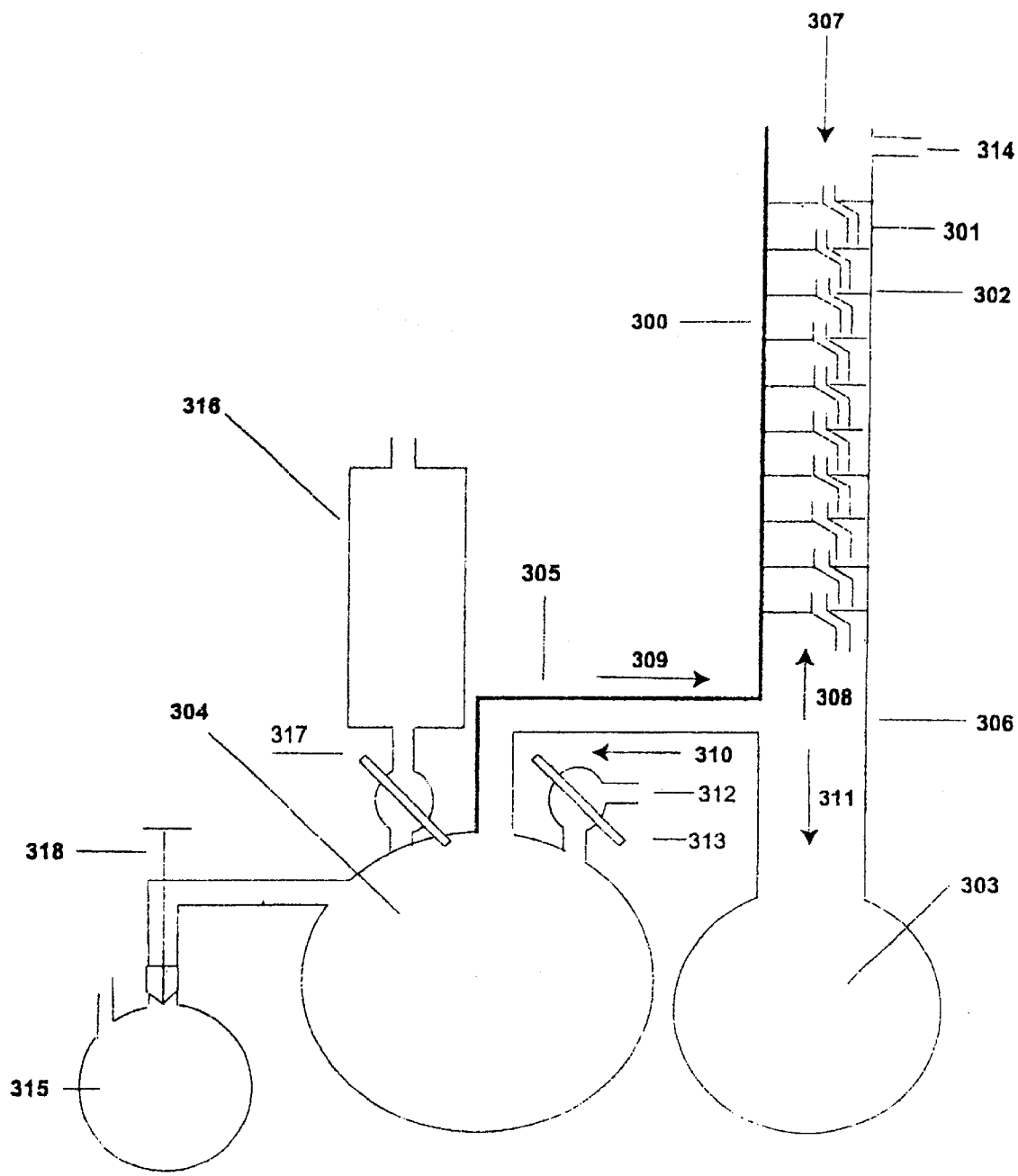

FIG. 3 is described below in Example 1.

Figure 4:
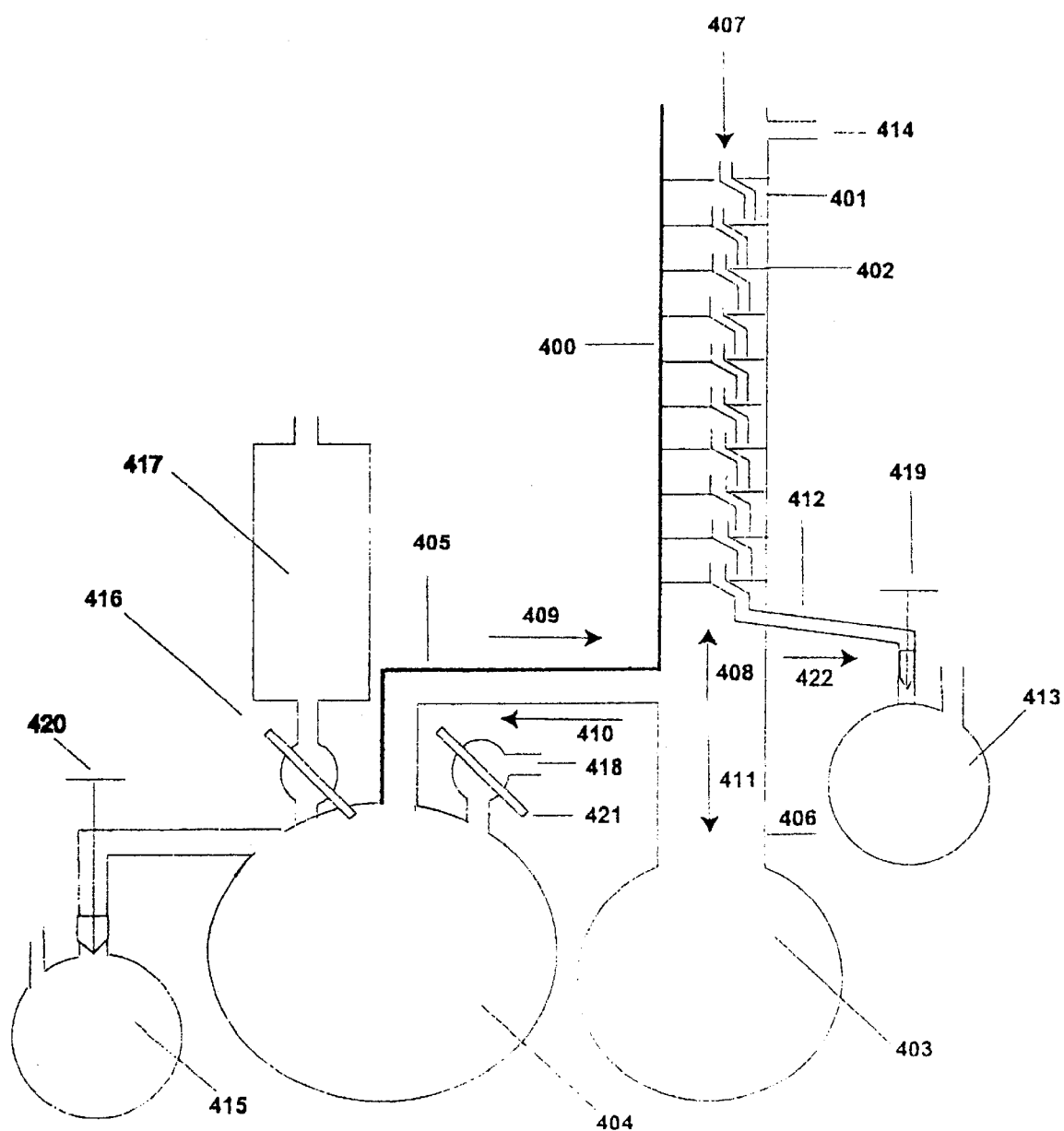

Referring to FIG. 4, there is provided a column 400 with sieve trays 402 and downcomers 401, a supply/collector flask 404 connected thereto by a first connector 405. A first valve 416 regulates a liquid fresh feed 417 to supply/collector flask 404, and a third valve 420 regulates flow out of supply/collector flask 404 to a second collection flask 415. A polymer receiving flask 403 is connected to the column 400 by a 2-way adapter 406, and a second connector 412 and second valve 419 connects a first collection flask 413. Also provided is a first inlet 414 (e.g., a nitrogen inlet) in column 400. Furthermore, there is provided a second inlet 418 regulated by a fourth valve 421.

The set-up in FIG. 4 operates similarly to the set-up in FIGS. 1–3. Boiling liquid refluxes upwards through first connector 405 in the direction of third arrow 409 up though column 400 in the direction of second arrow 408. At the top of the column, LPE (not shown) is introduced into the top sieve tray 402. The liquid vapor phase condenses and flows down the column 400 in the direction of first arrow 407 through each sieve tray 402 through downcomers 401. The molten LPE also drips down the holes (not shown) in the sieve trays 402 (and sometimes through downcomers 401) through the column 400 in the direction of first arrow 407. However, second connector 412 is positioned such that the returning liquid condensate flows through second connector 412 in the direction of fifth arrow 422 and into first collection flask 413. First connector 405 is positioned such that any additional returning liquid condensate flows down first connector 405 in the direction of fourth arrow 410 back into supply/collector flask 404, whereas the molten LPE falls through 2-way adapter 406 in the direction of fifth arrow 411 into the polymer receiving flask 403, where it may be recycled back to the top of column 400. The contents of supply/collector flask 404 may be removed into second collection flask 415 as regulated by third valve 420 from time to time. First phase fresh feed 417 may provide additional liquid into supply/collector flask 404, in order to compensate for such removal.

Other equipment for this process may also be used, but generally it will be equipment that is suitable for doing extractions of one material which is "mixed" with another material. For descriptions of various process and equipment types for performing liquid-liquid extractions see, for instance, R. E. Treybal in R. H. Perry, Chemical Engineers Handbook, $5^{th}$ Ed., McGraw-Hill Book Co., New York, 1973, Section 15, and P. A. Schweitzer, Ed., Handbook of Separation Techniques for Chemical Engineers, McGraw-Hill Book Co., New York, 1979, p. 1–255 to 1–342, both of which are hereby included by reference. Many of the techniques described in these references can be adapted for use in the present process, and some may be modified to use gas as the fluid. In any of the. apparatus for the use of the liquid, it is preferred that the LPE be present as a relatively thin layer, so that extraction of the CEOs from the LPE layer by the liquid fluid is relatively rapid.

My processes differ from the usual extraction in that the material being extracted is continuously being formed from the material from which it is being separated. It is believed that partial or complete conversion of the LPE into CEO(s) is possible in a single pass or with multiple passes through preferred processes of my invention. For example, if any preferred apparatus of FIGS. 1–4 is employed, a column could be designed to obtain complete conversion by allowing for sufficient hold-up time on the trays and overall residence time in the column. Even assuming that only partially converted molten LPE would still exit the bottom of the column, this exiting LPE can be returned to the top of the column for further conversion. Preferably at least 25 weight percent, more preferably at least 50 weight percent, especially preferably at least 75 weight percent and very preferably at least 90 weight percent of the original LPE is converted to and isolated as CEO(s) in one or more passes through the process, preferably in one pass through the process.

It is preferred to add some additional diol to the process to maintain hydroxyl ended LPEs. This is believed to maintain a relatively high rate for the process, but also helps to copnvert all, or almost all, of the LPE added to the process to CEOs. All that is needed in the process is a small amount of diol, which will probably be present as another phase if it is below its boiling point.

When liquid is used as the fluid in the process it is preferred that the volume ratio of liquid in contact with the LPE in the process is about 10:1 to about 1:10, preferably about 2:1 to about 1:2. "In contact with" in this instance means under conditions in which the CEO can be effectively extracted from the LPE. In the processes described in FIGS. 1–4 for instance this would include the liquid inside the column between and including the top and bottom trays, and all the LPE in the trays and in the downcomers. It does not, for example, include the liquid in 103, 104, 203, 204, 213, 216, 303, 304, 315, 316, 403, 404, 413, 415, and 417, and not in any of the connections such as 405 and 412 between these portions of the apparatus. It does not include LPE in 103, 106, 203, 206, 303, 306, 403 and 406.

In my processes (with both liquid and gas as the fluid) the extraction is done under conditions which also cause the LPE to react to form CEOs while the extraction is also proceeding. This usually means temperatures sufficient to cause such reactions. The temperatures employed can be quite varied, and are dependent upon process variables such as the rate of production of the CEOs desired, the particular LPE used and its reactivity and thermal stability, whether a catalyst is present and what its activity enhancement is, etc. The temperature is readily determined by things such as the known thermal stabilities of various LPEs, and/or some simple experimentation. Generally speaking this process for many LPEs can be run in the temperature range of about 100° C. to about 400° C.

A catalyst to accelerate the reaction of the LPE to form CEO(s) may optionally be present in my processes, in particular in contact with (for example dissolved in) the LPE. These catalysts are preferably those catalysts which are particularly useful for transesterification. The catalysts are added to the LPE in any convenient form, for example dissolved in or mixed with the LPEs and in typical amounts, usually 0.01 to 1.0 weight percent of the original amount of LPE present or the amount of LPE being fed to the process. It is understood that the relative amounts of LPE to catalyst within the process may vary in different parts of the process because the LPE is constantly being converted to CEOs.

In some processes using gas or liquid as the fluid it may be desirable to stir the LPE and/or liquid to attain equilibrium and promote extraction of the CEO(s) into the fluid [and thereby also promote formation of the CEO(s)]. When gas is the fluid this may simply be done by the agitation caused by the bubbles themselves flowing through the process liquid(s). When a liquid is used as the fluid agitators of some sort may be used in one or both of the liquid and LPE to promote equilibrium. In the processes shown in FIGS. 1–4, some "agitation" is caused by the fluid flow between trays and also by the bubbles of the vapor of the liquid percolating through the liquid on top of the trays.

The CEOs which are produced by my processes are useful as monomers for forming polyesters by ring opening polymerizations. The relatively low viscosity CEOs may be pumped into a mold and polymerized in the mold to form a final part shape which may be used.

In the Examples inherent viscosities of linear polyesters were measured in 50:50 (v:v) methylene chloride:trifluoroacetic acid at 25° C. at a concentration of 100 mg in 100 ml of solvent. In the Examples, PBT is poly(1,4-butylene terephthalate).

EXAMPLES

Examples 1–3 illustrate preferred embodiments of my invention, which is not limited by or to these Examples 1–3.

Example 1

Referring to FIG. 3, an Oldershaw, perforated bubble plate, distillation column (28 mm inner diameter, 10 plate sections, available from LabGlass, Vineland, N.J., as item #LG-5621-122) (300) having downcomers (301) and sieve trays (302) was connected via 2-way adapter connector arm (305) to a 500 ml 3-neck round bottom flask (304) and a 100 ml single neck round bottom flask (hereafter 100 ml flask) (303). The 500 ml 3-neck round bottom flask (304) was fitted with a 250 ml addition funnel (316) and a first inlet (312) with a first stopcock (313) for nitrogen purge. The 500 ml 3-neck round bottom flask (304) was set in a 500 ml heating mantle (GLAS-COL®, model 100B TM106, available from VWR Scientific Products, Willard, Ohio) (not shown). No Heating Mantle was used for the 100 ml flask.

The distillation column (300) was wrapped with 4 foot heating tape (Electrothermal® HT6 Series #HT641S962, available from VWR Scientific Products, Willard, Ohio) (not shown). The lower extension of the 2-way adapter vertical leg (306) was wrapped with a second, smaller, 2 foot heating tape (ELECTROTHERMAL® HT640, available from VWR Scientific Products, Willard, Ohio) (not shown). The 2-way adapter connector arm (305) was wrapped with 2 layers of NOMEX® insulating tape (available from VWR Scientific Products, Willard, Ohio) (not shown). The top half of the 500 ml 3-neck round bottom flask (304) was wrapped with 2 layers of insulating cloth.

The 500 ml 3-neck round bottom flask (304) was charged with ~400 ml of tetradecane (Aldrich Chemical #17,245-6, b.p. 252° C.) and ~150 ml of tetradecane were charged into the 2-way adapter vertical leg (306) and the 100 ml flask (303). Purge nitrogen was applied to the 500 ml 3-neck round bottom flask (304) through first inlet (312) and first stopcock (313) and to the top of the distillation column (300) through second inlet (314).

Experimental Segment 'A'

The 500 ml heating mantle and the 2-foot heating tape on the lower extension of the 2-way adapter vertical leg (306) were heated sufficient to bring the tetradecane to a boil. Once the tetradecane was boiling in the 500 ml 3-neck round bottom flask (304), the nitrogen purge to the 500 ml 3-neck round bottom flask (304) was stopped. The distillation column (300) was allowed to come to a steady reflux over an ~1 h time period. [Referring to FIG. 3, third arrow (309) and second arrow (308) indicate generally the direction of flow of the vapor phase tetradecane in the system, and first arrow (307) and fourth arrow (310) indicate generally the direction of flow of the returning tetradecane condensate in the system.] During this time, heat was applied to the distillation column (300) via the heating tape. After this equilibration period, ~1.0 g of poly(butylene terephthalate) pre-polymer (prepared from terephthalic acid, 1,4-butanediol and 0.1% monobutylstannoic acid catalyst, inherent viscosity=0.17) was added to the top tray of the distillation column (300).

Over the next 6–7 h, poly(butylene terephthalate) pre-polymer was added to the top of the distillation column (300) at a rate of approximately 1.0 g/min. [Referring to FIG. 3, first arrow (307) and fifth arrow (311) indicate generally the direction of flow of the pre-polymer melt through the system.] During this time, hot tetradecane solution was allowed to drain from the 500 ml 3-neck round bottom flask (304) by means of the regulator valve (318), into the collection flask (315), at a rate of approximately 1–2 ml/minute. Fresh, filtered, tetradecane was supplied to the 500 ml 3-neck round bottom flask (304) through the 250 ml addition funnel (316) and second stopcock (317) at a rate of 1–2 ml/min.

After a running time of 6–8 h, all heat was turned off and the distillation column (300) and the tetradecane solution was allowed to cool to room temperature over-night. All of the tetradecane solution was then filtered through a coarse sintered filter. This included all of the tetradecane in the 500 ml 3-neck round bottom flask (304), the contents of the 2-way adapter vertical leg (306), the contents of the 100 ml flask (303) and all the tetradecane solutions collected in the collection flask (315). After filtration, the precipitate was digested 2 times with hexane and then air dried. The weight of CEO is reported in Row 'A' of Table 1. In addition, all of the LPE which had exited the bottom of the distillation column (300) (the Exit Polymer) was collected and washed with hexane, and air dried. The weight of the Exit Polymer is shown in Row 'A' of Table 1. A significant amount of poly(butylene terephthalate) remained in the distillation column (300). The total amount of poly(butylene terephthalate) fed to the distillation column (300) is also shown in Row 'A' of Table 1.

Experimental Segments 'B', 'C' and 'D'

Experimental Segments 'B', 'C', and 'D' were carried out in succession after the completion of Experimental Segment 'A', as follows. For each Experimental Segment, the distillation process equipment was reassembled and heat applied in the same order as described above in Experimental Segment 'A'. Once distillation had been established, poly(butylene terephthalate) pre-polymer was introduced into the top of the distillation column (300) at the rate of approximately 0.5 g/min. . During this time, hot tetradecane solution was allowed to drain from the 500 ml 3-neck round bottom flask (304) by means of the regulator valve (318), into the collection flask (315), at a rate of approximately 1–2 ml/min. Fresh, filtered, tetradecane was supplied to the 500 ml 3-neck round bottom flask (304) through the 250 ml addition funnel (316) at a rate of 1–2 ml/min. After a running time of 6–8 h, all heat was turned off and the distillation column (300) and the tetradecane solution was allowed to cool to room temperature overnight. All of the tetradecane solution was then filtered through a coarse sintered filter. This included all of the tetradecane in the 500 ml 3-neck round bottom flask (304), the contents of the 2-way adapter vertical leg (306), the contents of the 100 ml flask (303) and all the tetradecane solutions collected in the collection flask (315). After filtration, the precipitate was digested 2 times with hexane, and then air dried. The weight of CEO obtained is reported in Rows 'B', 'C' and 'D', respectively, of Table 1. In addition, all of the polymer which had exited the bottom of the distillation column (300) (the Exit Polymer) was collected and washed with hexane, and air dried. The weight of the Exit Polymer is shown in Rows 'B', 'C', and 'D', respectively, of Table 1. A significant amount of poly(butylene terephthalate) remained in the distillation column (300).

The total amount of poly(butylene terephthalate) fed to the distillation column (300) for each Experimental Segment is also shown in Rows 'B', 'C', and 'D', respectively, of Table 1.

Experimental Segment 'E'

Experimental Segment E was carried out after completion of Experimental Segment D, as follows. The distillation process equipment was reassembled and heat applied in the same order as described in Experimental Segment 'A'. During this Experimental Segment 'E', however, no poly(butylene terephthalate) pre-polymer was added to the top of the distillation column (300). The hot tetradecane solvent was allowed to act on that poly(butylene terephthalate) remaining on the sieve trays (302) of the distillation column (300). During this time, hot tetradecane solution was allowed to drain from the 500 ml 3-neck round bottom flask (304) by means of the regulator valve (318), into the collection flask (315), at a rate of approximately 1–2 ml/min. Fresh, filtered, tetradecane was supplied to the 500 ml 3-neck round bottom flask (304) through the 250 ml addition funnel (316) at a rate of 1–2 ml/min. After a running time of 6–8 h, all heat was turned off and the distillation column (300) and the tetradecane solution allowed to cool to room temperature overnight. All of the tetradecane solution was then filtered through a coarse sintered filter. This included all of the tetradecane in the 500 ml 3-neck round bottom flask (304), the contents of the 2-way adapter vertical leg (306), the contents of the 100 ml flask (303) and all the tetradecane solutions collected in the collection flask (315). After filtration, the precipitate was digested 2 times with hexane, and then air dried. The weight of CEO obtained is reported in Row 'E' of Table 1. In addition, all of the polymer which had exited the bottom of the distillation column (300) (the Exit Polymer) was collected and washed with hexane, and air dried. The weight of the Exit Polymer is shown in Row 'E' of Table 1. A significant amount of poly(butylene terephthalate) still remained in the distillation column (300).

The total amount of crude poly(butylene terephthalate) CEO collected during this experiment as a percentage of the total amount of linear poly(butylene terephthalate) fed to the top of the distillation column (300) was about 35 weight %. Analysis of the CEO was performed using a Hewlett Packard 1100 Liquid Chromatograph fitted with 2 PLGEL® 50A chromatography columns. The 1100 LC was attached to two detectors; [1] HP G1315 Diode Array Detector and [2] HP G1946A Mass Spectrometer Detector. It is believed, based on analysis of the LC scans, that all of the precipitate samples contained at least 90%, by weight, CEOs. Typical CEO distributions from PBT were approximately dimer 30%, trimer 40%, tetramer 15%, pentamer 10%, others 5% (percentages are mole percents).

TABLE 1

| Experimental Segment | Total PBT Feed (grams) | CEO (grams) | Exit Polymer (grams) |
|---|---|---|---|
| 'A' | 6.91 | 3.64 | 0.29 |
| 'B' | 4.76 | 0.76 | 0.73 |
| 'C' | 4.18 | 0.64 | 2.89 |
| 'D' | 1.94 | 0.91 | 3.00 |
| 'E' | — | 0.32 | 0.94 |
| TOTAL | 17.79 | 6.27 | 7.85 |

Example 2

A sample (Sample 2.1, Table 2 below) of poly(1,4-butylene terephthalate) (PBT) Exit Polymer from Example 1 was measured by Liquid Chromatography/Mass Spectrometry analysis and found to contain 0%, by weight, CEO. This compares with a CEO content of 12.48%, by weight, determined for the linear polybutylene terephthalate pre-polymer feed used in Example 1 (PBT Feed, Table 2 below).

Individual samples of Exit Polymer, approximately 25 mg in weight, were then placed in a TA Instruments 9000 Thermal Gravimetric Analyzer for various time periods at 250° C. The samples were then analyzed for CEO content. The results are shown in Table 2.

TABLE 2

| SAMPLE | HOLD-UP @250° C. (min) | Cyclic Dimer + Trimer |
|---|---|---|
| 2.1 | 0 | 0.00% |
| 2.2 | 1 | 0.18% |
| 2.3 | 2 | 1.22% |
| 2.4 | 3 | 1.15% |
| 2.5 | 4 | 3.93% |
| 2.6 | 5 | 5.17% |

TABLE 2-continued

| SAMPLE | HOLD-UP @250° C. (min) | Cyclic Dimer + Trimer |
|---|---|---|
| 2.7 | 5 | 4.21% |
| 2.8 | 6 | 4.05% |
| 2.9 | 7 | 4.20% |
| 2.10 | 8 | 4.37% |
| 2.11 | 9 | 4.94% |
| 2.12 | 10 | 3.58% |
| 2.13 | 30 | 3.98% |
| 2.14 | 60 | 5.67% |
| 2.15 | 120 | 3.52% |
| 2.16 | 180 | 5.53% |
| 2.17 | 1000 | 9.31% |
| PBT Feed | | 12.48% |

Example 3

Referring to FIG. 3, an Oldershaw, perforated bubble plate, distillation column (28 mm inner diameter, 10 plate sections, available from LabGlass, Vineland, N.J., as item #LG-5621-122) (300) having downcomers (301) and sieve trays (302) was connected via 2-way adapter connector arm (305) to a 250 ml 3-neck round bottom flask (304) and a 100 ml single neck round bottom flask (hereafter 100 ml flask) (303). The 250 ml 3-neck round bottom flask (304) was fitted with a 250 ml addition funnel (316) and a first inlet (312) with a first stopcock (313) for nitrogen purge. The 250 ml 3-neck round bottom flask (304) was set in a 250 ml heating mantle (GLAS-COL-Col® model 100B TM106, available from VWR Scientific Products, Willard, Ohio) (not shown in FIG. 3). No heating mantle was used for the 100 ml flask. The distillation column (300) was wrapped with 4 foot heating tape (ELECTROTHERMAL® HT6 Series #HT641S962, available from VWR Scientific Products, Willard, Ohio) (not shown). The lower extension of the 2-way adapter vertical leg (306) was wrapped with a second, smaller, 2 foot heating tape (ELECTROTHERMAL® HT640, available from VWR Scientific Products, Willard, Ohio) (not shown). The 2-way adapter connector arm (305) was wrapped with 2 layers of NOMEX® insulating tape (available from VWR Scientific Products, Willard, Ohio) (not shown). The top half of the 250 ml 3-neck round bottom flask (304) was wrapped with 2 layers of insulating cloth.

The 250 ml 3-neck round bottom flask (304) was charged with ~200 ml of FLUORINERT®, perfluorinated liquid organic compounds, FC-70 (3M Industrial Chemical products Division, St. Paul, Minn. 55144, b.p. 215° C.) and ~150 ml of FLUORINERT®, perfluorinated liquid organic compounds, FC-70 were charged into the 2-way adapter vertical leg (306) and the 100 ml flask (303). Purge nitrogen was applied to the 250 ml 3-neck round bottom flask (304) through first inlet (312) and first stopcock (313) and to the top of the distillation column (300) through second inlet (314).

The 250 ml heating mantle and the 2-foot heating tape on the lower extension of the 2-way adapter vertical leg (306) were heated sufficient to bring the FLUORINERT®, perfluorinated liquid organic compounds, FC-70 to a boil. Once the FLUORINERT®, perfluorinated liquid organic compounds, FC-70 was boiling in the 250 ml 3-neck round bottom flask (304), the nitrogen purge to the 250 ml 3-neck round bottom flask (304) was stopped. The distillation column (300) was allowed to come to a steady reflux over an ~1 h time period. [Referring to FIG. 3, third arrow (309) and second arrow (308) indicate generally the direction of flow of the vapor phase FLUORINERT®, perfluorinated liquid organic compounds, FC-70 in the system, and first arrow (307) and fourth arrow (310) indicate generally the direction of flow of the returning FLUORINERT®, perfluorinated liquid organic compounds, FC-70 condensate in the system.] During this time, heat was applied to the distillation column (300) via the heating tape. After this equilibration period, ~0.5 g of poly(trimethylene terephthalate) polymer (prepared from terephthalic acid, 1,3-propanediol, inherent viscosity=1.0) was introduced to the top tray of the distillation column (300).

Over the next 6–7 h, poly(trimethylene terephthalate) pre-polymer was added to the top of the distillation column (300) at a rate of approximately 0.35 g/min. [Referring to FIG. 3, first arrow (307) and fifth arrow (311) indicate generally the direction of flow of the pre-polymer melt through the system]. During this time, hot FLUORINERT®, perfluorinated liquid organic compounds, FC-70 solution was allowed to drain from the 250 ml 3-neck round bottom flask (304) by means of the regulator valve (318), into the collection flask (315), at a rate of approximately 1–2 ml/minute. Fresh, filtered, FLUORINERT®, perfluorinated liquid organic compounds, FC-70 was supplied to the 250 ml 3-neck round bottom flask (304) through the 250 ml addition funnel (316) and second stopcock (317) at a rate of 1–2 ml/min.

After a running time of 6–8 h, all heat was turned off and the distillation column (300) and the FLUORINERT®, perfluorinated liquid organic compounds, FC-70 solution was allowed to cool to room temperature overnight. All of the FLUORINERT®, perfluorinated liquid organic compounds, FC-70 solution was then filtered through a coarse sintered filter. This included all of the FLUORINERT®, perfluorinated liquid organic compounds, FC-70 in the 250 ml 3-neck round bottom flask (304), the contents of the 2-way adapter vertical leg (306), the contents of the 100 ml flask (303) and all the FLUORINERT®, perfluorinated liquid organic compounds, FC-70 solutions collected in the collection flask (315).

After filtration, the precipitate was analyzed by liquid chromatography and was found to be primarily cyclic poly(trimethylene terephthalate) dimer, molecular weight=413. Analysis of the CEO was performed using a Hewlett Packard 1100 Liquid Chromatograph fitted with 2 PLGEL® 50A chromatography columns. The 1100 LC was attached to two detectors; [1] HP G1315 Diode Array Detector and [2] HP G1946A Mass Spectrometer Detector. It is believed, based on analysis of the LC scans, that all of the precipitate samples contained at least 90%, by weight, CEOs.

Analysis of the FLUORINERT®, perfluorinated liquid organic compounds, FC-70 liquid by Liquid Chromatograph did not show evidence of linear polyester. An advantage of this method is that the fluorinated liquid has no flash point, thus, making this an extremely safe process to operate.

While this invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent formulations and functions.

What is claimed is:

1. A process for the production of cyclic ester oligomers, comprising, subjecting a linear polyester to a continuous reactive extraction at a temperature at which said linear polyester is molten and which is sufficient to cause formation of said cyclic ester oligomers, wherein at least some of said linear polyester is converted to one or more cyclic ester oligomers and said extraction is carried out by a fluid which is one or both of a liquid and a gas to separate said cyclic ester oligomers from said linear polyester.

2. The process as recited in claim 1 wherein said fluid is a liquid.

3. The process as recited in claim 2 wherein a transesterification catalyst is also present.

4. The process as recited in claim 3 wherein said linear polyester has the repeat unit

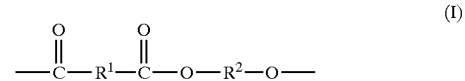

(I)

wherein each $R^1$ in the LPE is independently hydrocarbylene or substituted hydrocarbylene, and each $R^2$ in the LPE is independently hydrocarbylene or substituted hydrocarbylene.

5. The process as recited in claim 4 wherein each $R^1$ is independently arylene or substituted arylene, and each $R^2$ is independently alkylene or substituted alkylene.

6. The process as recited in claim 5 wherein said linear polyester is poly(ethylene terephthalate), poly(trimethylene terephthalate), or poly(1,4-butylene terephthalate).

7. The process as recited in claim 3 wherein at least about 50 weight percent of the linear polyester added to said process is recovered in one pass as cyclic ester oligomer.

8. The process as recited in claim 2 wherein a volume ratio of said liquid to said linear polyester in said process is about 10:1 to about 1:10.

9. The process as recited in claim 3 wherein said liquid is an alkane or a perfluorocompound.

10. The process as recited in claim 5 wherein said liquid is an n-alkane.

11. The process as recited in claim 10 wherein said n-alkane is tetradecane or hexadecane.

12. The process as recited in claim 1 wherein said fluid is a gas.

13. The process as recited in claim 12 wherein a transesterification catalyst is also present.

14. The process as recited in claim 13 wherein said linear polyester has the repeat unit

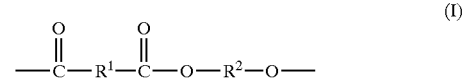

(I)

wherein each $R^1$ in the LPE is independently hydrocarbylene or substituted hydrocarbylene, and each $R^2$ in the LPE is independently hydrocarbylene or substituted hydrocarbylene.

15. The process as recited in claim 14 wherein each $R^1$ is independently arylene or substituted arylene, and each $R^2$ is independently alkylene or substituted alkylene.

16. The process as recited in claim 13 wherein said linear polyester is poly(ethylene terephthalate), poly(trimethylene terephthalate), or poly(1,4-butylene terephthalate).

17. The process as recited in claim 13 wherein at least about 50 weight percent of the linear polyester added to said process is recovered in one pass as cyclic ester oligomer.

* * * * *